United States Patent
Garcia Morchon et al.

(10) Patent No.: US 11,728,988 B2
(45) Date of Patent: Aug. 15, 2023

(54) ELLIPTIC CURVE ISOGENY BASED KEY AGREEMENT PROTOCOL

(71) Applicant: KONINKLIJKE PHILIPS N.V., Eindhoven (NL)

(72) Inventors: Oscar Garcia Morchon, Eindhoven (NL); Sauvik Bhattacharya, Eindhoven (NL); Ludovicus Marinus Gerardus Maria Tolhuizen, Waalre (NL); Ronald Rietman, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 541 days.

(21) Appl. No.: 16/488,835

(22) PCT Filed: Feb. 12, 2018

(86) PCT No.: PCT/EP2018/053389
§ 371 (c)(1),
(2) Date: Aug. 26, 2019

(87) PCT Pub. No.: WO2018/158065
PCT Pub. Date: Sep. 7, 2018

(65) Prior Publication Data
US 2020/0014534 A1    Jan. 9, 2020

(30) Foreign Application Priority Data
Feb. 28, 2017  (EP) .................................. 17158508

(51) Int. Cl.
*H04L 9/30* (2006.01)
*H04L 9/08* (2006.01)
(Continued)

(52) U.S. Cl.
CPC ............ *H04L 9/3073* (2013.01); *G06F 7/725* (2013.01); *H04L 9/0643* (2013.01);
(Continued)

(58) Field of Classification Search
CPC ... H04L 9/0841; H04L 9/0838; H04L 9/3073; H04L 9/8066; H04L 9/0866
See application file for complete search history.

(56) References Cited

U.S. PATENT DOCUMENTS 7,499,544 B2    3/2009    Jao et al.
8,250,367 B2    8/2012    Broker et al.
(Continued)

FOREIGN PATENT DOCUMENTS

WO    2017103226 A1    6/2017

OTHER PUBLICATIONS

Broker et al: S.D. Galbraith and K.G. Paterson (Eds): Pairing 2008, LNCS 5209, pp. 100-112,2008.
(Continued)

*Primary Examiner* — Zachary A. Davis

(57) ABSTRACT

An electronic key pre-distribution device for configuring multiple network nodes with local key information is provided. The key pre-distribution device applies at least a first hash function and a second hash function to a digital identifier of a network node. The first and second hash functions map the digital identifier to a first public point and a second public point on a first elliptic curve and second elliptic curve. A first and second secret isogeny are applied to the first and second public elliptic curve points, to obtain a first private elliptic curve point and second private elliptic curve point that are part of private key material for the network node.

17 Claims, 6 Drawing Sheets

(51) Int. Cl.
  *G06F 7/72* (2006.01)
  *H04L 9/06* (2006.01)
  *H04L 9/32* (2006.01)

(52) U.S. Cl.
  CPC .......... *H04L 9/0841* (2013.01); *H04L 9/0866* (2013.01); *H04L 9/3257* (2013.01); *H04L 2209/60* (2013.01); *H04L 2209/80* (2013.01)

(56) References Cited

U.S. PATENT DOCUMENTS

| | | | |
|---|---|---|---|
| 8,259,932 B2 | 9/2012 | Lauter et al. | |
| 10,116,443 B1 * | 10/2018 | Kalach | H04L 9/0841 |
| 10,637,656 B2 * | 4/2020 | Brown | H04L 9/0841 |
| 2005/0094806 A1 * | 5/2005 | Jao | H04L 9/3257 |
| | | | 380/30 |
| 2006/0129800 A1 * | 6/2006 | Lauter | H04L 9/3247 |
| | | | 713/151 |
| 2006/0177051 A1 * | 8/2006 | Lauter | H04L 9/3073 |
| | | | 713/181 |

OTHER PUBLICATIONS

Gailbraith et al.: "Computing Pairings Using x-Coordinates Only"; Designs, Codes and Cryptography, Mar. 2009, vol. 50, Issue 3, pp. 305-324, 2008.

Garcia-Morchon et al: "A Lightweight Collusion-Resistant Key Predistribution Scheme"; Philips Group Innovation, 2014,28 Page Document.

Jao et al.: "Towards Quantum-Resistant Cryptosystems From Supersingular Elliptic Curve Isogenies"; PQCRYPTO 2011, LNCS 7071, pp. 19-34, 2011.

PCT/EP2018/053389 ISR & Written Opinion, Apr. 4, 2018, 15 Page Document.

Anirudh Sankar: "Classical and Quantum Algorithms for Isogeny-Based Cryptography"; A Thesis Presented to the University of Waterloo, Ontario, Canada, 2015 68 Page Document.

David Shumow: "Isogenies of Elliptic Curves: A Computation Approach"; Submitted as a Masters Thesis in the Mathematics Department of the University of Washington, Oct. 2009, 55 Page Document.

Xi Sun et al: "Toward Quantum-Resistant Strong Designated Verifier Signature From Isogenies"; 2012 IEEE Fourth International Conference on Intelligent Networking and Collaborative Systems, pp. 292-296.

Koshiba et al "Pairing Cryptography Meets Isogeny: A New Framework of Isogenous Pairing Groups" Cryptology ePrint Archive, Report 2016/1138 (2016).

\* cited by examiner

ELLIPTIC CURVE ISOGENY BASED KEY AGREEMENT PROTOCOL

CROSS-REFERENCE TO PRIOR APPLICATIONS

This application is the U.S. National Phase application under 35 U.S.C. § 371 of International Application No. PCT/EP2018/053389, filed on Feb. 12, 2018, which claims the benefit of European Patent Application No. 17158508.6, filed on Feb. 28, 2017. These applications are hereby incorporated by reference herein.

FIELD OF THE INVENTION

The invention relates to an electronic key pre-distribution device for configuring multiple network nodes with local key information, a first electronic network node arranged for a key agreement protocol with a second network node, an electronic method for key pre-distribution configuring multiple network nodes with local key information, an electronic method for establishing a shared key between a first network node and a second network node, and a computer readable medium.

BACKGROUND OF THE INVENTION

Key agreement, e.g., in wireless sensor networks, is an important cryptographic primitive. Once two parties have agreed on a common shared key, they can use said key to protect communication between them using, e.g., encryption and authentication. So-called identity-based key pre-distribution schemes provide a possible way to simplify the key agreement. An identity-based key pre-distribution scheme has two phases: key pre-distribution and key derivation. Associated with the two phases of the identity-based key pre-distribution scheme are two algorithms: a local key material generation algorithm and a key establishment algorithm, respectively.

Using an identity-based key pre-distribution scheme, two network nodes can agree on a shared key which is based on their identities. A traditional approach in which a key is determined for each pair of network nodes would grow quadratically. However, an identity-based key pre-distribution scheme needs only distribute one set of local key material for each node, and thus grows linearly.

The identity-based key pre-distribution scheme is set up by providing a trusted third party with root key material. The trusted third party may be the manufacturer of the device, and may, e.g., provision devices during their manufacturing or in some other trusted environment. Alternatively, the trusted third party may be a certificate authority device, e.g., a device that provisions devices, e.g., using some online protocol.

During key pre-distribution, local key material is generated for each network node and stored on the network node, by applying the local key material generation algorithm on the root key material and an identifier of each network node. During the key derivation phase, two network nodes can derive a shared key by applying the key establishment algorithm on their local key material and the identifier of the other network node. For example, a first node may apply the key establishment algorithm on the second identifier of the second network node and its own first local key material, while the second node may apply the key establishment algorithm on the first identifier of the first network node and its second local key material. The result of the key establishment algorithm is an identity-based key shared between two network nodes.

There exists a number of identity-based key pre-distribution schemes. For example, an identity-based key pre-distribution scheme is described in "HIMMO—A lightweight collusion-resistant key pre-distribution scheme", by Oscar Garcia-Morchon, Domingo Gomez-Perez, Jaime Gutierrez, Ronald Rietman, Berry Schoenmakers and Ludo Tolhuizen. Published in Cryptology ePrint Archive, Report 2014/698. An improved version of HIMMO is described in European patent application "Improved system for key sharing" filed with the EPO, EP2016081604 W, 16 Dec. 2016, published as WO2017103226A1, 22 Jun. 2017, of the same applicant, and incorporated by reference. HIMMO, like some other identity-based key-distribution schemes, has the disadvantage that the unprocessed keys may be slightly off. This may be acceptable, or additional key-reconciliation data (also referred to as helper data) is used to arrive at a shared key. The key-reconciliation data is usually generated by the first network node that has access to both identities, e.g., the second network node, if the first network note initiated the key agreement.

In an embodiment, the root key material comprises a bivariate polynomial and the local key material comprises a univariate polynomial. For example, in the Blundo identity-based key pre-distribution scheme the root key material is formed by a bivariate polynomial $f(x, y)$. Local key material g and a first node with identifier $ID_1$, is formed by collapsing the bivariate to a univariate polynomial $g(y)=f(ID_1,y)$. A node with local key material g and the identifier of a second node $ID_2$ obtains a shared key by computing $g(ID_2)$. All polynomial computations may be done modulo a modulus m.

Recently investigations have started if a bilinear mapping defined on an elliptic curve could be used to create an identity-based key redistribution system. Concerns have arisen though if such approaches allow for sufficient variety in their underlying cryptographic objects and are thus sufficiently hardened against cryptographic analysis. Furthermore, there is a desire that cryptographic protocols resist the new threat of quantum computers.

SUMMARY OF THE INVENTION

An electronic key pre-distribution device is provided for configuring multiple network nodes with local key information. The key pre-distribution device comprises a storage comprising information representing a first secret isogeny for a first elliptic curve and a second secret isogeny for a second elliptic curve, an isogeny being arranged to receive a point on an elliptic curve and to produce a point on an elliptic curve as output, a processor circuit configured to obtain a digital identifier for a network node, apply at least a first hash function and a second hash function to the digital identifier, the first and second hash functions mapping the digital identifier to a first public point and a second public point on a first elliptic curve and second elliptic curve, the first elliptic curve being different from the second elliptic curve, the first and second public point being part of public key material for the network node, apply the first and second secret isogeny to the first and second public elliptic curve point, thus obtaining a first private elliptic curve point and second private elliptic curve point being part of private key material for the network node, and a communication interface arranged to configure the network node with the private elliptic curve point.

Furthermore, an electronic network node is provided arranged for a key agreement protocol with a second network node. For ease of reference the network node will be identified as the first network node, distinguishing it from a second network node with which is communicates. The adjective 'first' and 'second' have no further meaning. The first network node may be the initiating network node, which initiates the protocol with the second network node, and the second network node may be the responding network node; however, it may also be the other way around.

The network node comprises a storage comprising a digital identifier for the first network node and/or a first and second public elliptic curve point, the first and second public elliptic curve point lying on a first and second elliptic curve, and a first private elliptic curve point and second private elliptic curve point corresponding to the first public elliptic curve point and the second public elliptic curve point through a first and second secret isogeny, the first public elliptic curve point and the second public elliptic curve point corresponding to the digital identifier of the network node through a first and second hash function, the first and second private elliptic curve points being computed by a key pre-distribution device, the processor circuit is configured to obtain a public elliptic curve point for the second network node, the public elliptic curve point lying on a first one of the first and second elliptic curves, selecting a private elliptic curve point from the first and second private elliptic curve points lying on a second one of the first and second elliptic curves, the first one and the second one being different, apply a bilinear map to the selected private point of the first network node, and the obtained public elliptic curve point of the second network node or the public elliptic curve point of the second network node to which a public isogeny has been applied by the first node, deriving a cryptographic key from the result of the bilinear map.

Including isogenies on elliptic curves into the cryptographic protocol is advantageous as they are assumed to have an increased quantum-resistance. In particular, there is no efficient known quantum algorithm to reconstruct an isogeny between two super singular elliptic curves. Furthermore, the isogenies increase the choices that are made in the algorithms, and thus make attacking the system harder. An advantage of the protocol implemented in the network node is that shared keys can be computed while exchanging only few and simple messages. In fact, if the digital identifier of the other node can be obtained without a message, then no messages need to be exchanged at all to obtain the shared key. The derived key can then be used to derive a key for symmetric encryption, etc. Elliptic curve points also cover compressed points, e.g., only the x-coordinate, or the x-coordinate with an additional bit to determine the sign of the y-coordinate.

A network node is an electronic device. For example, it may be a mobile electronic device, such as a mobile phone. The network node may be a set-top box, smart-card, a computer, etc. The key pre-distribution device may be a computer, a server, etc. The key pre-distribution device may also be a communication device, such as a phone, e.g., arranged to set-up a so-called ad-hoc wireless communication network, e.g., a mesh network. The methods described herein may be applied in a wide range of practical applications. Such practical applications include financial applications, e.g., to share credit card information, privacy enhancing applications, e.g., messaging applications, medial applications, etc.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code stored on a computer readable medium for performing a method according to the invention when said program product is executed on a computer.

In a preferred embodiment, the computer program comprises computer program code adapted to perform all the steps of a method according to the invention when the computer program is run on a computer. Preferably, the computer program is embodied on a computer readable medium.

Another aspect of the invention provides a method of making the computer program available for downloading. This aspect is used when the computer program is uploaded into, e.g., Apple's APP STORE™, GOOGLE PLAY™, or Microsoft's Store, and when the computer program is available for downloading from such a store.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1 schematically shows an example of an embodiment of a key pre-distribution system, FIGS. 2a-2c schematically show examples of an embodiment of a storage of a key pre-distribution device, FIG. 3a schematically shows an example of an embodiment of a key agreement system, FIG. 3b schematically shows an example of an embodiment of a key agreement system, FIG. 4 schematically shows an example of an embodiment of a key agreement method, FIG. 5 schematically shows an example of an embodiment of a key pre-distribution method, FIG. 6 schematically shows an example of an embodiment of a key agreement method, FIG. 7a schematically shows a computer readable medium having a writable part comprising a computer program according to an embodiment, FIG. 7b schematically shows a representation of a processor system according to an embodiment.

LIST OF REFERENCE NUMERALS IN FIG. 1-3b

Figure 1:
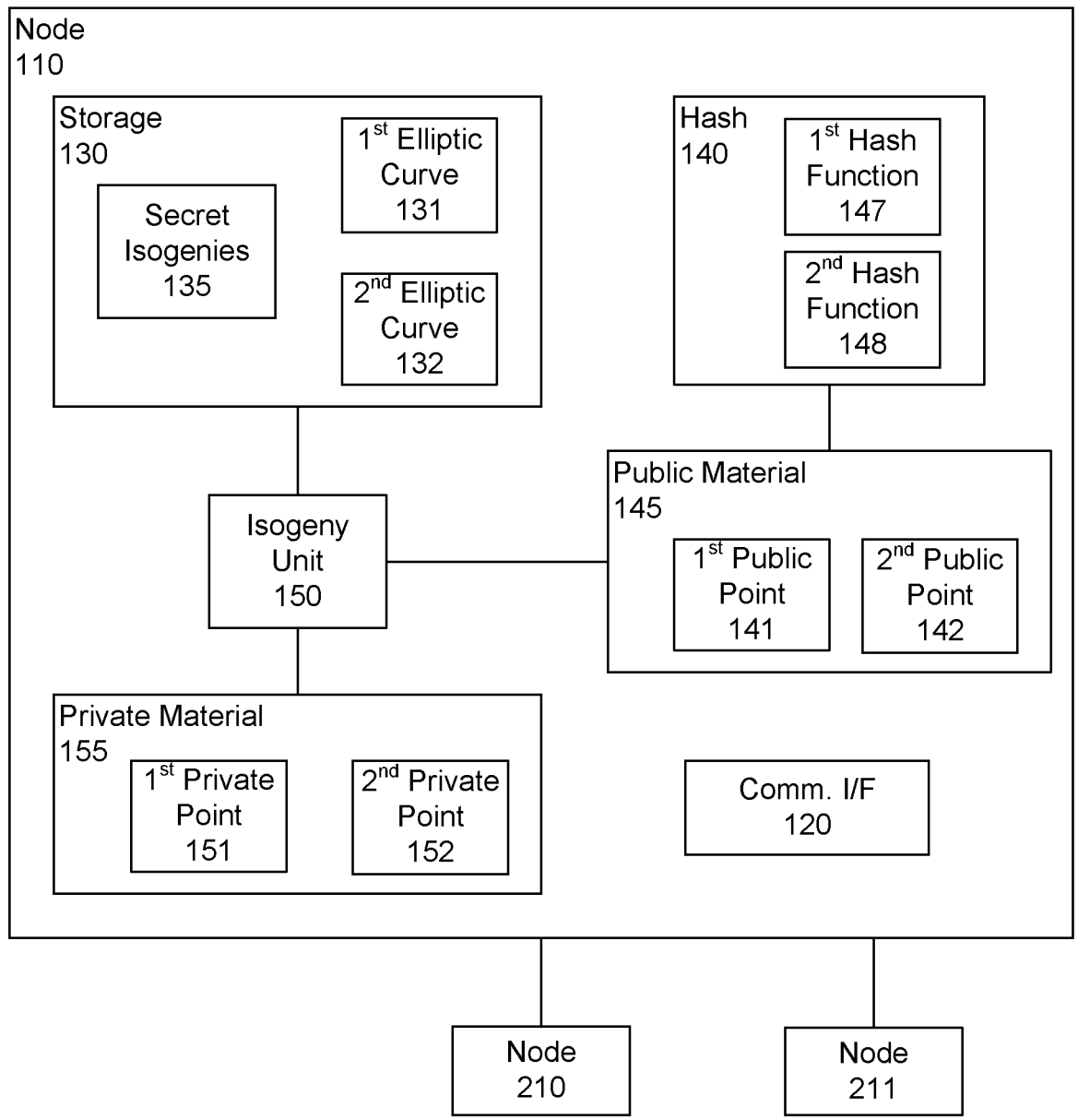

100 a key pre-distribution system
110 an electronic key pre-distribution device 120 a communication interface
130 a storage
131 a first elliptic curve
132 a second elliptic curve
135 a first secret isogeny
140 an elliptic hash unit
141 a first public point
142 a second public point
145 public key material
147 a first hash function
148 a second hash function
150 an isogeny unit
151 a first private elliptic curve point
152 a second private elliptic curve point
155 private key material
161, 167, 168 a storage
162 a first isogeny
163 a second isogeny
164 a secret integer
165 a first secret integer
166 a second secret integer
200, 201 a key agreement system
210, 211 a network node
215, 216 a first network node
220 a communication interface,
230 a storage
231 a first elliptic curve
232 a second elliptic curve
234 a digital identifier
235 a public isogeny
241 a first public elliptic curve point
242 a second public elliptic curve point
251 a first private elliptic curve point
252 a second private elliptic curve point
260 a shared key unit
270 an isogeny unit
280 a key confirmation unit

DETAILED DESCRIPTION OF THE EMBODIMENTS

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them.

Further, the invention is not limited to the embodiments, and the invention lies in each and every novel feature or combination of features described herein or recited in mutually different dependent claims.

The growth of the Internet of Things (IoT) and the approach of a quantum age has resulted in a need for lightweight, fast, (quantum) secure protocols for IoT networks, even in the case of multiple IoT device compromises. Embodiments described below provide Non-interactive Key Distribution (NIKD) schemes based on public and/or secret isogenies respectively. Including isogenies on elliptic curves into a cryptographic protocol is advantageous as they are presumed quantum-resistant especially when used with super singular elliptic curves. Especially embodiments in which secret isogenies are provided increased resistance to attack even when attacked using a quantum computer. In addition, embodiments are lightweight and classically-secure against collusion/compromise of any number of devices. The lightweight and fast performance of both schemes makes them suitable for IoT use-cases.

Below some mathematical background is summarized.

For current cryptographic purposes, an elliptic curve may be given by the canonical equation $y^2=x^3+ax+b$, where $a,b$ are elements from a finite field with characteristic larger than three. Elliptic curves over finite fields with characteristic two or three may be described by a similar but different type of equation. Points on the curve may be identified by a pair of coordinates, e.g., an x and y coordinate, that satisfies the defining formula of the elliptic curve. Commonly, a point on the curve is represented in a compressed format. For example, a point on the curve may be uniquely identified by only its x-coordinate and a single bit that identifies the sign of the accompanying y-coordinate. In fact, often one leaves out the y-coordinate altogether. Although this introduces a small ambiguity in the point, for most applications, this is not relevant. For the purpose of this document we will consider such representations as points on the curve as well.

Pairings (also known as bilinear forms): A pairing is a map from the direct product of two cyclic (additive) groups $G_1$ and $G_2$ to a group $G_T$ such that for all $P \in G_1$, $Q \in G_2$ and all positive integers $a,b$ we have that $e(aP,bQ)=[e(P,Q)]^{ab}$, and $e(P,Q) \neq 1$ for some $(P,Q) \in G_1 \times G_2$. An important pairing in cryptography is the so-called Weil pairing. In that case, a curve $E(K)$ is chosen over a finite field $K$ that contains an m-th root of unity. The Weil pairing e takes as inputs points $P,Q \in E(K)(m)=\{T \in E(K) | mT=0\}$ and produces an m-th root of unity in K, that is, $e(P,Q) \in \{x \in K | x^m=1\}$. If points P and Q are given in compressed form, with a bit to indicate signs, one can compute the corresponding y coordinates and subsequently compute the pairings. Alternatively, it is possible to compute, at least for certain pairings like the Weil pairing and the Tate pairing, the value z such that for all points P and Q, $z=(e(P,Q))^{a(P,Q)}$ where the exponent $a(P,Q)$ equals 1 or −1. This is explained in "Computing pairings using x-coordinates only" by S. Galbraith and X. Lin, Designs, Codes and Cryptography, Vol. 50, Issue 3, pp. 305-324, March 2009. In the same reference, it is explained that from the values of the x-coordinates only, it is possible to compute the trace of e(P,Q), that is, the value $T(P,Q)=e(P,Q)+(e(P,Q))^{-1}$.

Isogenies: Informally, isogenies are maps between elliptic curves. An isogeny can be defined as a non-constant function, defined on a first elliptic curve, that takes values on a second elliptic curve, and preserves point addition, i.e., it preserves the elliptic curve structure. See the thesis by D. Shumow, "Isogenies of Elliptic Curves: A Computational Approach." More formally, let E1/K and E2/K be two elliptic curves, an isogeny may be defined as a rational map of elliptic curves $\varphi: E1(\overline{K}) \to E2(\overline{K})$, with coordinates from $\overline{K}$ that preserves the point at infinity, i.e., $\varphi(\infty)=\infty$. It follows that such a mapping preserves the group structure. See the thesis by A. Sankar, "Classical and Quantum Algorithms for Isogeny-based Cryptography."

Typically, an isogeny is defined as a mapping between two different curves, however we will also consider isogenies between a curve and itself. In the latter case, isogenies can be defined, e.g., as elliptic curve multiplications with a fixed integer, e.g., mapping an elliptic curve point P to the elliptic curve points sP. Note that this mapping preserves addition. Isogenies between different curves have a much richer structure than can be defined by a single integer.

A standard way to represent an isogeny $\varphi$ is to give 3 homogeneous polynomials $f_1, f_2, f_3 \in K[X,Y,Z]$ satisfying $\varphi(x:y:z)=(f_1(x,y,z): f_2(x,y,z): f_3(x,y,z)) \in P^2(K)$ for a field K. If l denotes the degree of $\varphi$, then usually one of these polynomials will have degree roughly l. Reference is made to the paper "Evaluating large degree isogenies and applications to pairing based cryptography" by Reinier Broker, Denis Charles, and Kristin Lauter. In section 2 of that paper alternative representation of isogenies between elliptic curves over finite fields are given whose length is polynomial in log l. The paper furthermore presents an algorithm that evaluates isogenies between elliptic curves over finite fields.

In this patent application, various embodiment of network nodes and key pre-distributions devices are proposed. These embodiments include isogeny based NIKD schemes. First an introduction is given, and additional embodiments and details are described with reference to the figures.

Nodes in a network register themselves with a trusted third party (TTP) in order to receive secret key-material(s) and optionally public identifier(s) (e.g. a public identifier). Using these, any two nodes can establish a secret key that is unique to them and known only by that pair of nodes, that can then be used by this pair to communicate securely with each other.

Embodiments use two elliptic curves $E_1, E_2$. The TTP hashes an identifier (ID) of a network node to points on these two elliptic curves $H_1(ID)$ and $H_2(ID)$. The latter are public points, and may be stored on a network node, or may be computed by a network node from an identifier directly. The TTP maps the two public points to two private points by mapping the public points on their respective elliptic curves to two private points also on two different elliptic curves. The embodiments can be divided into two main types.

In a first type, the TTP maintains a secret isogeny and its so-called dual isogeny related to the above two curves. The isogeny maps from the first elliptic curve to the second elliptic curve, whereas the dual isogeny maps from the second elliptic curve to the first elliptic curve. During node registration, these are used by the TTP to calculate two unique secret key-materials for a node, after calculating two public points for it. Key-establishment between two nodes may be accomplished using one of the peer node's (public) points and one of the node's two own secret key-materials, which are images of the node's own identifiers in the secret isogeny and the secret dual isogeny respectively, in the Weil pairing. Note that the Weil pairing is an example of a bilinear map. In case of the Weil paring, it is required that all points have a specified order, e.g. m. Note that in the first type a public point and its corresponding private point lie on different elliptic curves.

In a second type, the TTP maintains an isogeny for each elliptic curve, but these isogenies map from the elliptic curve to itself. For example, the TTP may have a single integer s and perform a point multiplication with the integer s for each curve. The TTP may also have two integers $s_1$ and $s_2$, using the first integer for point multiplication on the first curve and the second integer for point multiplication on the second curve. Again, during node registration, the two isogenies are used by the TTP to calculate two unique secret key-materials for a node, after calculating two public points for it. Key-establishment between two nodes may be accomplished using one of the peer node's (public) points and one of the node's two own secret key-materials. Finally, a bilinear map, e.g., the Weil paring is applied to the two points. Here a public isogeny between the two elliptic curves is used as a system parameter.

Mathematically, an embodiment of the first type may work as follows. The first and second network node are referred as initiator and responder depending on who initiated the key agreement protocol.

TTP has:
  Two ordinary elliptic curves E1 and E2 over a field $F_p$ with isomorphic endomorphism rings of discriminant $\Delta < -4$,
  a secret key, which is an isogeny $\varphi$: E1→E2 specified by an ideal L.
  Public pairings e':G1×G2→GT and e:G1×G'2→GT where G1 and G2 are subgroups of the points on E1, and G'1,G'2 are subgroups of the points of E2.
  $\varphi'$ is the dual isogeny, also secret, that is, for all $P \in G_1'$, $Q \in G_2$, It holds that $e(\varphi(P),Q)=e'(P,\varphi'(Q))$. Furthermore, it is assumed that $\varphi$ maps G2 to G'2, and $\varphi'$ maps G'1 to G1.

During key material extraction, each entity with identity ID gets H1(ID) a point in G2 and H2(ID) a point in G'1, which serve as its two public identifiers. It further obtains from the TTP two secret key-materials:
  Secret key-material $S1=\varphi(H1(ID))$
  Secret key-material $S2=\varphi'(H2(ID))$ During key generation, two parties (I)nitiator and (R)esponder that want to generate a common key do the following:
  Initiator computes: $K\_IR=e(H2(R), \varphi(H1(I)))$
    Initiator uses K_IR to encrypt message and sends it to R.
    Responder computes $K\_RI=e'(\varphi'(H2(R)), H1(I))$, and decrypts using key K_RI.

Operational correctness for the first type is demonstrated by noting that, due to the adjoint property of the isogeny $\varphi$ and its dual $\varphi'$ with respect to the Weil pairings: $K\_IR=e(H2(R), \varphi(H1(I)))=e'(\varphi'(H2(R)), H1(I))=K\_RI$.

In an embodiment, G1=G2=E1[m], G'1=G'2=E2[m], and e,e' are the Weil pairings on E1 and E2. In an alternative embodiment, public key material and secret key material are compressed. The hash functions H1 and H2 may only provide the x-coordinate of a point in E1 and E2 respectively. From H1(ID) and H2(ID) the TTP can compute y-coordinates y1(ID),y2(ID) such that U1(D)=(H1(ID),y1(ID)) is on E1 and U2(ID)=(H2(ID), y2(ID)) is on E2. The secret keying material S1(ID) may equal the x-coordinate of $\varphi(U1(D))$ and $\varphi'(U2(ID))$ respectively. During key generation, two parties (I)nitiator and (R)esponder that want to generate a common key do the following:
  From its own secret key S2(I) and the public key H2(R), the initiator computes a value $T_{IR}$ satisfying $T_{IR}=e(U2(R),\varphi(I))+e(U2(R),\varphi(U1(I)))^{-1}$, e.g., as explained by Galbraith and Lin.
  The initiator uses $T_{IR}$ as key to encrypt a message M and sends it to R.
  The responder R uses its own secret key S1(R) and the public key H1(I) to compute a value $T_{RI}$ satisfying $T_{RI}=e'(U2(R),H1(I))+e'(U2(R),H1(I))^{-1}$ and decrypts the message using $T_{RI}$ as key.

Operational correctness follows from the adjoint property of $\varphi'$. It is clear that variations on these embodiments are possible, e.g. with compressed public key and uncompressed secret key, or vice versa., with compressed keys with additional bits to determine signs, etc.

More general, one may have: G1, G2 subgroups of E1, e': G1×G2→GT; and G'1,G'2 subgroups of E2, e: G1'×G2'→GT; and $\varphi(G1)=G1'$, $\varphi'(G2')=G2$. For the Weil pairings: one may require mappings into points on E1, E2 for which the order divides m, and GT consist of m-th root of unity in a finite field. The paring need not necessarily be defined for all points in E1.

Mathematically, an embodiment in the second type may work as follows

TTP has secret s.

During key extraction, each entity with identity ID gets $H_1(ID) \in E_1, H_2(ID) \in E_2$, and $sH_1(ID) \in E_1$, $sH_2(ID)$ where $H_1$ is a hash function to $E_1$, and $H_2$ is a hash function to $E_2$. $H_1(ID)$ and $H_2(ID)$ serves as the public identifiers of the entity, whereas $sH_1(ID), sH_2(ID)$ serves as its secret key-material.

During operation, entity (I)nitiator wishing to talk to (R)esponder computes $K\_IR = e(\varphi(H_1(R)), sH_2(I))$, where e is a pairing on $E_2$. Then identity I sends message M encrypted with K_IR to R, R computes $K\_RI = e(\varphi(sH_1(R)), H_2(I))$ Operational correctness for the second type is demonstrated by noting that: $K\_IR\ e(\varphi(H(R)), sH(I)) = e(\varphi(H(R)), H(I))\hat{\ }s = e(\varphi(sH(R)), H(I)) = K\_RI$ An embodiment of the second type may optionally have compressed points and use computation of the trace of the pairing operation by using x-coordinates only, and use the trace as key, or as input to key derivation function.

For embodiments using the first type, using secret isogenies: The analyses of possible attacks against this scheme that are detailed below are applicable irrespective of whether the elliptic curves used are ordinary or super singular. In order to recover the TTP's master secret, i.e., the secret isogeny $\varphi: E1 \rightarrow E2$ and its dual $\varphi'$, an attacker who has compromised multiple nodes (and has thus gained access to their secret key-materials of the form $\varphi(H1(ID))$ and $\varphi'(H2(ID))$, where ID is the identifier of the compromised node) must attempt to reconstruct the two secret isogenies mentioned above, using the evaluations of these isogenies, which are precisely the secret key-materials of the compromised nodes. Recovering the secret key K_IR calculated by an initiator node I for a responder node R from the public parameters H1(I), H2(I), H1(R) and H2(R) is considered a hard problem.

For super singular elliptic curves, the security of this variant is related to the Super singular Isogeny Diffie-Hellman (SIDH) problem. The security of SIDH is based only on the assumption that given a pair of super singular curves E1 and E2, finding an isogeny $\phi$ such that $\phi: E1 \rightarrow E2$ is both a classical and quantum-hard problem. This is a variation of the classical Abelian Hidden Shift problem, however the class group of the common endomorphism ring of super singular curves is not abelian, due to which the only known efficient quantum algorithm for finding secret isogenies does not work in the super singular case. One may use elliptic curves over a field with characteristic p for which the group of geometric points of order p is trivial as super singular.

Indeed, it may not even be enough for an attacker to solve an instance of the discrete logarithm problem, since it is unclear whether there exists a point Q on E2 such that for any initiator I, the initiator node I's secret key-material $\varphi(H1(I))$ can be represented as a multiple of Q. In case the initiator node I's secret key-material $\varphi(H1(I))$ cannot be represented as a point on an elliptic curve, then the type 1 embodiments have increased quantum-resistance. Indeed, the question is if $\varphi(H1(I))$ can be written as scalar multiple of a known point on E2. If so, the discrete log problem is relevant. E2(m) need not have a single generator.

If the discrete logarithm problem is assumed to be hard (i.e., it is assumed that no attacker possessing quantum-computing capabilities exists), then it is assumed that the attacker fails to recover the secret key K_IR.

For embodiments using the second type, using a public isogeny: In this scheme, in order to recover the secret key K_IR calculated by an initiator node I with a responder node R, an attacker must solve the discrete logarithm problem to obtain s, from the public key H(I) of the initiator with identity I and sH(I) is the secret key of the initiator node with identity I. If she is successful, the attacker also recovers the TTP's master secret s and can then recover keys belonging to any node that is registered with the TTP. Even if the attacker is able to compromise multiple nodes and gain access to their secret key-material sH(ID), where ID is the identifier of the compromised node, it is assumed that the attacker is still unable to recover the TTP's master secret s, as long as a single instance of the discrete logarithm problem remains hard to solve.

In the absence of quantum computers, if it is assumed that an attacker capable of efficiently solving the discrete logarithm problem does not exist, then both the proposed types are secure and operationally correct. If such an attacker does exist however, the second type may be compromised. Embodiments according to the first type are not directly impacted though in the sense that the TTP's secret (the isogeny) cannot be recovered.

The cryptographic operations on the node-side in embodiment using the first type only comprise the evaluation of Weil pairings over elliptic curves, which are operationally relatively efficient. This has desirable implications for nodes, which are typically IoT devices with limited computational and memory capabilities. The calculation of an isogeny between two elliptic curves and the evaluation of an isogeny for an elliptic curve point are comparatively more intensive, but in this variant such isogeny is only computed at the TTP.

FIG. 1 schematically shows an example of an embodiment of a key pre-distribution system 100. System 100 comprises an electronic key pre-distribution device 110 and multiple network nodes. Shown in FIG. 1 are network nodes 210 and 211. The number of network nodes is typically much larger, e.g., larger than 1000, 10000, etc. Key pre-distribution device 110 configures the multiple network nodes for a key agreement protocol; In particular, key pre-distribution device 110 may perform the key pre-distribution phase of an identity-based key pre-distribution scheme, and configures the network nodes 210, 211 with local key material so that later any two of the multiple network nodes can securely agree on shared key between them. The local key material includes at least two private points on two elliptic curves. These private points are private to the network node, and/or to any trusted devices such as device 110. The local key material may also include non-private elements, e.g., an identifier (ID) of the device, public elliptic curve points, and optionally a public isogeny. Provisioning is described primarily with respect to node 210, but the other nodes may be provisioned similarly.

Key pre-distribution device 110 comprises a communication interface 120 arranged to configure the network node with the private elliptic curve point. The communication interface may be of the same type as used between the network nodes (see below), but may also be of a different type. For example, communication interface 120 may be a wired interface, e.g., a wired connection made in a testing and provisioning device during manufacture of network nodes 210, 211, etc. For example, communication interface 120 may comprise a connection pad or connection port. Communication interface 120 may also be digital wired network connection, or a wireless network connection, or a hybrid, etc. For example, communication interface 120 may comprise an antenna.

Key pre-distribution device 110 comprises a storage 130. Storage 130 comprises a representation of a first elliptic curve 131 and a second elliptic curve 132. Elliptic curves 131 and 132 are different curves, e.g., they may be defined by a different formula. An elliptic curve may be defined by the coefficients of a formula that defines it, e.g., in some canonical form. One such form is $Y^2=X^3+AX+B$, in which A and B are integers that define the elliptic curve. For example, storage 130 may store the coefficients A and B for the two elliptic curves. Alternatively, the two numbers may be hard coded in algorithms that employ them, e.g., curve multiplication or elliptic hash functions (see further below).

In an embodiment, the first and second elliptic curves are both defined over a field $F_q$ of characteristic p. For example, one may take $q=p^k$. In an embodiment, p=2, and k is an integer corresponding to a level of security (e.g. 128, 256). Along with curves 131, 132 information over the field for which they are defined can be stored. Note that the two curves are defined over the same field.

In an embodiment, the elliptic curves 131 and 132 are so-called ordinary (not super singular) curves. For example, one may take elliptic curves from "Recommended Elliptic Curves For Federal Government Use", a collection of elliptic curves is recommended for Federal government use. In an embodiment, the elliptic curves 131 and 132 are so-called super singular curves. Examples of super singular curves include: if K is a field of characteristic 2, every curve defined by an equation of the form $y^2+a_3y=x^3+a_4x+a_0$, with $a_3$ nonzero; if K is a field of characteristic 3, every curve defined by an equation of the form $y^2=x^3+a_4x+a_6$, with $a_4$ nonzero. Other examples are known.

Key distribution device 110 comprises an elliptic hash unit 140. Elliptic hash unit 140 is arranged to obtain a digital identifier (ID) for network node 210. The digital identifier may be received from network node 210, e.g., through communication interface 120. For example, network node 210 may send key pre-distribution device 110 an identifier. The identifier may also be assigned by key pre-distribution device 110, e.g., by hash unit 140. For example, the identifier may comprise a serial number of network node 210, a random number, a nonce, etc. For example, the identifier may comprise a digital computer address of the network node, e.g., an IP address, a MAC address, etc. The identifier may comprise a common name of the network node 210 or a name of a user of network node 210. The identifier may comprise information regarding roles or authorizations of the user. The latter options are useful for implicit authentication; for example, device 110 may assign or verify the roles.

Hash unit 140 is configured with two hash functions: a first hash function 147 and a second hash function 148. First hash function 147, $H_1$ maps the digital identifier of network node 210 to a first public point 141, $H_1(ID)$ on first elliptic curve 131. Second hash function 148, $H_2$ maps the digital identifier of network node 210 to a second public point 142, $H_2(ID)$ on second elliptic curve 132. The hash functions may include additional information together with the ID, e.g., an identification of key pre-distribution device 110, e.g., a salt, e.g., additional information on network node 210, e.g., a timestamp of the time of creating the local key material.

The public points 141 and 142 are part of the public key material 145 for network node 210. Generally speaking, there are two approaches to the public key material 145. Public key material 145 may be stored on network node 210, e.g., together with the private key material. In this case, the nodes may use a public point of another node and a private point of themselves to obtain a shared key. This avoids the need to compute the elliptic hash functions 147 and 148 at the node. In fact, the identifier of a network node is not even needed at the node in this case; key pre-distribution device 110 may just take a random number for it. On the other hand, the network nodes may also be configured to compute the public points 141 and 142 for another node from the identifier of that node. If any additional information is used, in addition to the identifier, then that additional information should be known to the node that computes public points 141 and 142. These embodiments can provide implicit authentication, but do require additional computations. Both approaches may be combined, e.g., some nodes compute the hashes themselves, some nodes use a pre-computed public point. In an embodiment, the public information comprises the identifier, and optionally any additional information that may be part of the public key material, but not the public points 141 and 142. In an embodiment, the public information comprises the public points 141 and 142, but not the identifier. In embodiment, the public information comprises the public points 141 and 142, and also the identifier, and optionally any additional information.

The hash functions 147 and 148 map a bit string such as a digital identifier to a point on an elliptic curve. Preferably, the hash functions are cryptographically collision resistant, i.e., it is hard to find two identifiers that map to the same elliptic curve point, but statistical collision resistance may be sufficient in embodiments, i.e., it is unlikely that two random identifiers map to the same elliptic curve point. Elliptic hashes may be constructed from conventional hash functions, such as a hash function from the SHA family, e.g., SHA-256, etc. For example, one may hash the ID and map it to a value in the field over which the elliptic curve is defined. Next substitute the value as the X value in the canonical representation of the elliptic curve (e.g. the coordinate with a cube power) and finally compute the value of Y. Which value of Y to choose (generally there are two solutions) may be decided by some bit of the hash of the identifier, or by a bit from a further hash of the identifier, etc. The hashes may be distinguished for the first and second curve by adding a curve identifier to the identifier, e.g., a magic number, e.g. 1 for curve 131 and 2 for curve 132. The two public points 141 and 142 lie on different ones of the first and second elliptic curves. For example, point 141 may lie on curve 131 and point 142 on curve 132.

Key pre-distribution device 110 comprises an isogeny unit 150. Isogeny unit 150 takes the public points computed by hash unit 140 and computes private elliptic curve points from them by applying isogenies on them. Storage 130 further comprises information 135 representing a first secret isogeny for first elliptic curve 131 and a second secret isogeny for second elliptic curve 132. Knowledge of these isogenies would break the entire system. For this reason, they are kept secret from anyone who cannot be trusted to protect the system.

Isogeny unit 150 is configured to apply the first secret isogeny to first public elliptic curve point 141 obtaining a first private elliptic curve point 151 and to apply the second secret isogeny to second public elliptic curve point 142 obtaining a second private elliptic curve point 152. First private elliptic curve point 151 lies on one of the elliptic curves 131, 132, and second private elliptic curve point 152 lies on the other one of the elliptic curves 131, 132. In some embodiments, the elliptic curve points 141 and 151 lie on the same curve, in some embodiments the elliptic curve points 141 and 151 lie on a different elliptic curve. The secret isogenies map point on an elliptic curve to a point on an elliptic curve. Various examples of storage 130 and isogeny unit 150 are illustrated with respect to FIGS. 2a-2c.

Figure 2A:
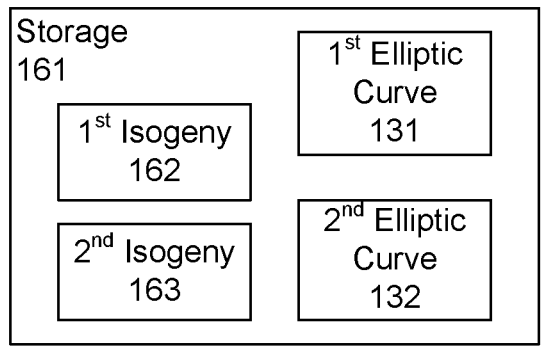

FIG. 2a schematically shows an example of an embodiment of a storage 161 of a key pre-distribution device. Storage 161 may be used in the key pre-distribution device 110 in the place of storage 130. Storage 161 may be used in embodiment of the first type as discussed above. In storage 161 the isogeny information 135 comprises a first isogeny 162 and a second isogeny 163.

First isogeny 162, φ is a mapping from first elliptic curve 131 to second elliptic curve 132. Second isogeny 163 is the dual of first isogeny 162, φ' and maps from second elliptic curve 132 to first elliptic curve 131. One may take the dual isogeny as the unique isogeny such that the composition φ'·φ is the multiplication on the first elliptic curve with the degree of the first isogeny. In an embodiment, the degree of first isogeny 162 is at least $2^{80}$, at least $2^{128}$, or at least $2^{256}$, etc. A large degree of the isogeny avoids exhaustive search attacks, since the elliptic curves that are used are public.

In this embodiment, the elliptic curve points 141 and 151 lie on different curves, and so do points 142 and 152. Isogeny unit 150 applies first isogeny 162 to point 141 and the second, dual isogeny 163 to point 142. This embodiment may in particular use the techniques disclosed in "Evaluating large degree isogenies and applications to pairing based cryptography" by Reinier Bröker, Denis Charles, and Kristin Lauter.

Figure 2B:
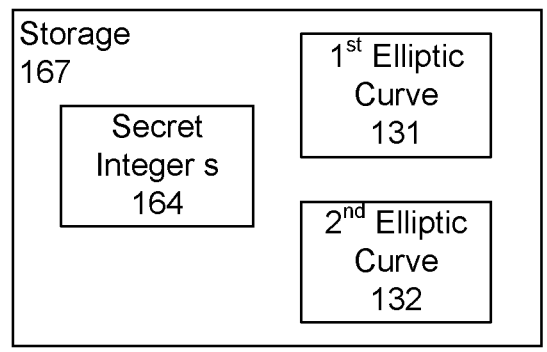

FIG. 2b schematically shows an example of an embodiment of a storage 167 of a key pre-distribution device. Storage 167 may be used in the key pre-distribution device 110 in the place of storage 130. Storage 167 may be used in an embodiment according to the second type. Storage 167 stores a secret integer 164, s. The first isogeny may be defined as a point multiplication on first curve 131 by s. The second isogeny may be defined as a point multiplication on second curve 132 also by s. In this embodiment, the elliptic curve points 141 and 151 lie on the same curve, and so do points 142 and 152. This embodiment may use conventional point multiplication algorithms.

Figure 2C:
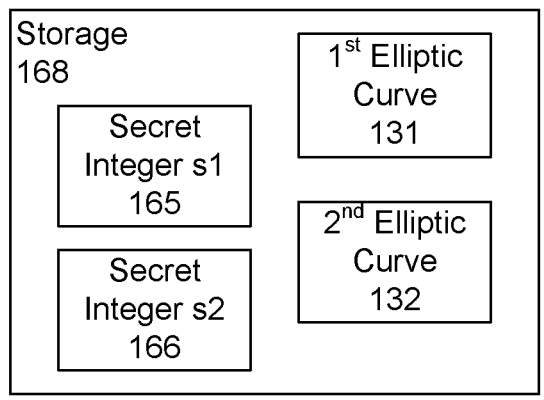

FIG. 2c schematically shows an example of an embodiment of a storage 168 of a key pre-distribution device. Storage 168 may be used in the key pre-distribution device 110 in the place of storage 130. Storage 168 may be used in an embodiment according to the second type. Storage 168 stores two secret integers 165, 166, $s_1$, $s_2$. The first isogeny may be defined as a point multiplication on first curve 131 by $s_1$. The second isogeny may be defined as a point multiplication on second curve 132 by $s_2$. In this embodiment, the elliptic curve points 141 and 151 lie on the same curve, and so do points 142 and 152. This embodiment may use conventional point multiplication algorithms.

In an embodiment, hash unit 140 is modified to also include a point multiplication. First public point 141 is computed as $a_1$ $H_1$ (ID) and second public point as $a_2$ $H_2$ (ID). The parameters are chosen such that $a_1 s_2 = a_2 s_1$. In an embodiment, the integers $a_1$ and $a_2$ could be public, although this could be avoided by using the public points instead of the hash functions in the network nodes; for example, using one of the other party's public points that a node received instead of its ID.

In an embodiment, all points that can be used have an order that divides a common number m. In this case, the case of FIG. 2c can reduced by re-defining H1,H2 and setting $s = s_1/a_1 = s_2/a_2$, where / is modular m division.

Returning to FIG. 1. First private elliptic curve point 151 and second private elliptic curve point 152 are part of private key material 155 for the network node 210. Key pre-distribution device 110 is configured to write at least the private key material 155 to network node 210. In addition, either the identifier for network node 210 or the public points 141 and 142, e.g., public key material 145 is written to network node 210. Writing both is also possible.

Figure 3A:
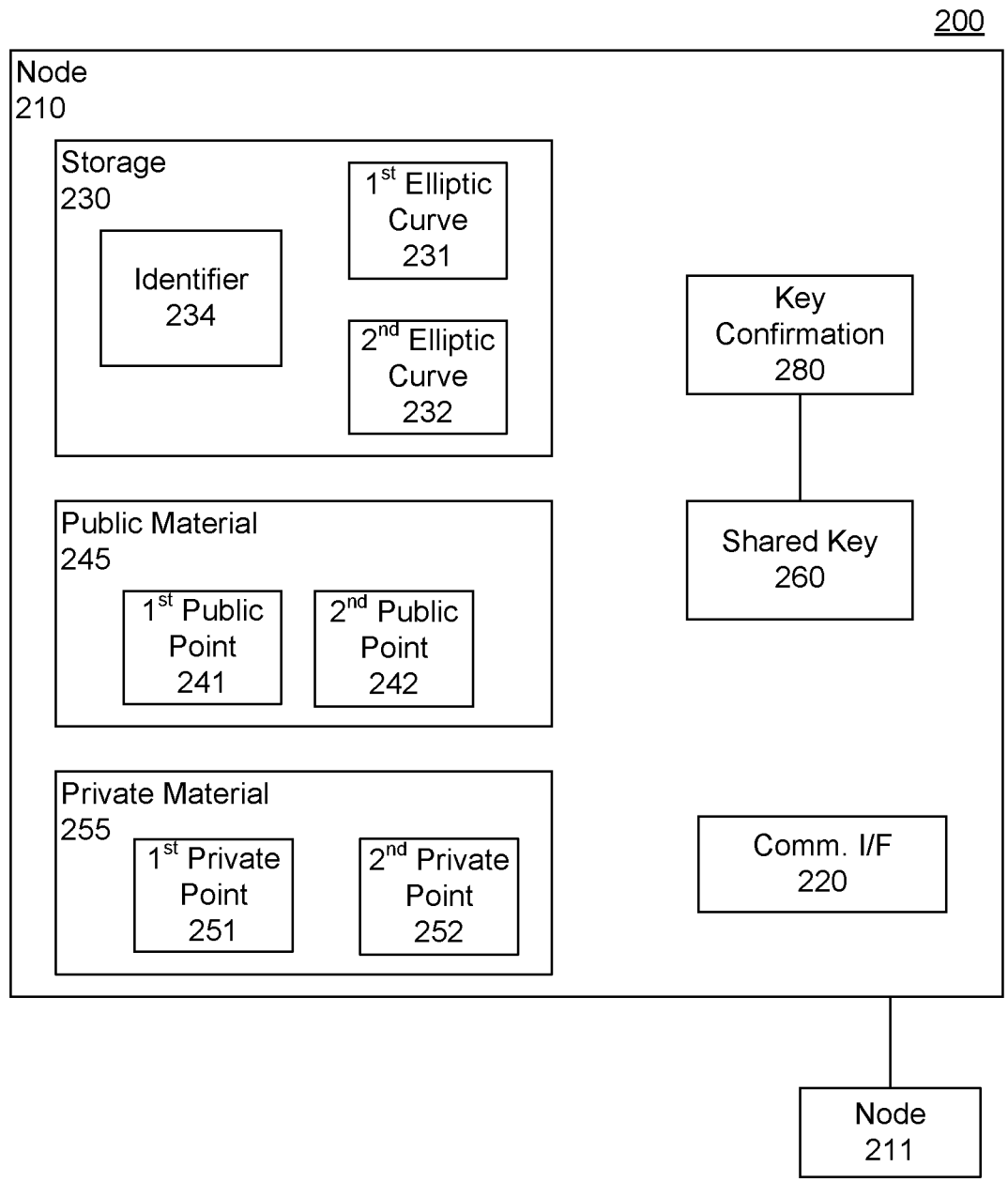

FIG. 3a schematically shows an example of an embodiment of a key agreement system 200. Key agreement system 200 comprises multiple nodes that have been configured for key sharing by a key pre-distribution device, such as key pre-distribution device 110. The multiple nodes in system 200 can communicate with each other through protected communication, protected using a shared key which each node can compute for any of the other nodes. key pre-distribution device 110 may also be part of system 200, e.g., to dynamically add new nodes, even after system 200 is operational. This is not necessary; in an embodiment, key pre-distribution device 110 is discarded after all nodes are provisioned with local key material.

With respect to FIG. 3a embodiments of the first type are illustrated. First network node 210 is arranged for a key agreement protocol with multiple network nodes. The key agreement protocol is illustrated with respect to a second network node 211. The structure of second network node 211 is largely the same as that of first network node 210, except where they have a sender-receiver relationship.

Network node 210 comprises a storage 230. Storage 230 comprises some means with which second node 211 can obtain a public point for network node 210. For example, storage 230 may store a digital identifier 234, $ID_1$ for the first network node. The digital identifier is the same as the identifier used to compute the private key material for node 210. Instead of the digital identifier, storage 230 may store a first public elliptic curve point 241 and second public elliptic curve point 242. The points may correspond to public points 141 and 142. Using the identifier has the advantage that implicit authentication is possible. Using the public points has the advantage that some computations are avoided at the nodes. First and second public elliptic curve point 241, 242 lie on a first and second elliptic curve respectively.

Storage 230 also stores a first private elliptic curve point 251 and a second private elliptic curve point 252. First private elliptic curve point 251 and a second private elliptic curve point 252 correspond to the first public elliptic curve point 241 and the second public elliptic curve point 242 through a first and second secret isogeny. First public elliptic curve point 241 and the second public elliptic curve point 242 in turn correspond to digital identifier 234 through a first and second hash function 147, 148.

In this embodiment, the first isogeny may be isogeny 162, and the second isogeny may be isogeny 163. Points 241 and 251 do not lie on the same curve, just as points 242 and 252 do not lie on the same curve.

Storage 230 may store the first elliptic curve 231 and second elliptic curve 232 on which the points in the public and private data lie. The curves may be represented, e.g., by coefficients of an equation for the curve. The curve can also be present implicitly, e.g., hard coded in the algorithm, the bilinear map, and the like.

The first and second network node 210, 211 each comprise a communication interface 220. Communication interface 220 of first network node 210 is arranged for digital communication with second network node 211. Typically, Communication interface 120 is arranged to communicate with many of the other nodes in system 200.

The communication interfaces may be arranged for digital communication with the other nodes in the key agreement system. It is not necessary though that all nodes in the system can be reached at all times. Communication interface 220 is arranged for digital communication. For example, the communication interfaces may be arranged to communicate over a computer network. For example, the communication interface may be arranged for wireless or wired communication. The communication between nodes 210 and 211 may also be a combination of wired and wireless connections. For example, the nodes in system 200, including nodes 210 and 211 may comprise an electronic storage that contains a communication identifier, which uniquely identifies the node within system 200. For example, the communication identifier may be included in digital messages exchanged between nodes 210 and 211, e.g., to address the message. For example, the communication identifier may an IP address, a MAC address, and the like. Advantageously, the same communication identifier may be comprised in the digital identifier 234 and used to compute the local key material.

Network node 210 comprises a shared key unit 260. Shared key unit 260 is configured to obtain a public elliptic curve point for the second network node (e.g. the point $H_2(ID_2)$, with $ID_2$ is the ID of the second network node), the public elliptic curve point lying on a first one of the first and second elliptic curves. As pointed out, there are different options to do this. For example, second network node 210 may send the public elliptic curve point ($H_2(ID_2)$) directly to first network node 210, e.g., through the communication interface 220. On the other hand, the second network node 211 may send its identifier $ID_2$ instead. In that case shared key unit 260 may apply one of the hash functions 147 and 148, e.g., the second hash function 148 to obtain a public point for second network node 211. Shared key unit 260 also selects a private elliptic curve point from the first and second private elliptic curve points lying on the same elliptic curve as the received public point, e.g., $\varphi(H_1(ID_1))$. In the end, shared key unit 260 obtains two elliptic curve points on the same curve: e.g., one public point obtained from second node 211 and one private point selected from storage 230. For example, the points used by shared key unit 260 may be $H_2(ID_2)$ and $\varphi(H_1(ID_1))$. To these two points a bilinear mapping e is applied by shared key unit 260, e.g., $e(H_2(ID_2),\varphi(H_1(ID_1)))$. The bilinear map may be the Weil pairing or the Tate pairing, etc. The outcome of the bilinear map may be used as the shared key. The output may also be further processed, e.g., using a key derivation function (KDF). In an embodiment, all output bits of the bilinear maps are input to a key derivation function (KDF), e.g., a cryptographic hash function. An example of a KDF is given in e.g., the CMLA_KDF from CMLA Technical Specification, Version: V1.43-20131218, or the KDF function defined in "DRM specification", OMA-TS-DRM-DRM-V2_0_2-20080723-A, Open Mobile Alliance™, Version 2.0.2, section 7.1.2, etc.

Second network node 211 also has a shared key unit which computes the corresponding computation e'($H_1(ID_1)$, $\varphi'(H_2(ID_2))$). Which computation to use may be hard wired to the party that initiated or responds. For example, it may be agreed that the initiating node uses a public point for the responding node on the second curve, and also a private point on the second curve; whereas the responding party takes a public point for the initiating node on the first curve, and a secret private point on the first curve. This could also be vice versa. In embodiment of this type, one node computes the bilinear map e' on the first curve while the other node computes the bilinear map e on the second curve. This works since, given the two bilinear maps on the two curves, and the isogeny, the dual isogeny is obtained.

Optionally, network node 210 may comprise a key confirmation unit 280. Key confirmation unit 280 is arranged to compute key confirmation data from the cryptographic key, and send the key confirmation data to the second network node. The key confirmation data may be some authentication token, e.g., an encrypted timestamp, e.g., an encrypted challenge from the second node, etc. The key confirmation data gives implicit authentication, in the sense that it proves to the second network node that the first network node must have valid key material, which in turn means that it registered with a key pre-distribution device 110. Alternatively, or in addition, key confirmation unit 280 may be arranged to receive key confirmation data for the cryptographic key from the second node, and verify the key confirmation data using the derived shared key. This verifies that the second network node correctly computed the cryptographic key, and thus provides implicit authentication.

The key agreement/distribution scheme illustrated with respect to FIG. 3a is suitable for application such as the Internet of Things, due to the non-interactive nature of key-establishment between nodes and the lightweight operations based on cryptographic pairings over elliptic curves. Isogenies are only carried out by the TTP, which may possess more resources and is therefore capable of carrying out such operations. The secret key-materials of each node can be securely provided by the TTP to the nodes, e.g., during node-bootstrapping. The security model considered while evaluating attacks is a collusion-based security model by default and takes into consideration attackers who can compromise the IoT nodes in the field and use their compromised key-materials to mount attacks on the rest of the network, and in particular on the TTP.

Figure 3B:
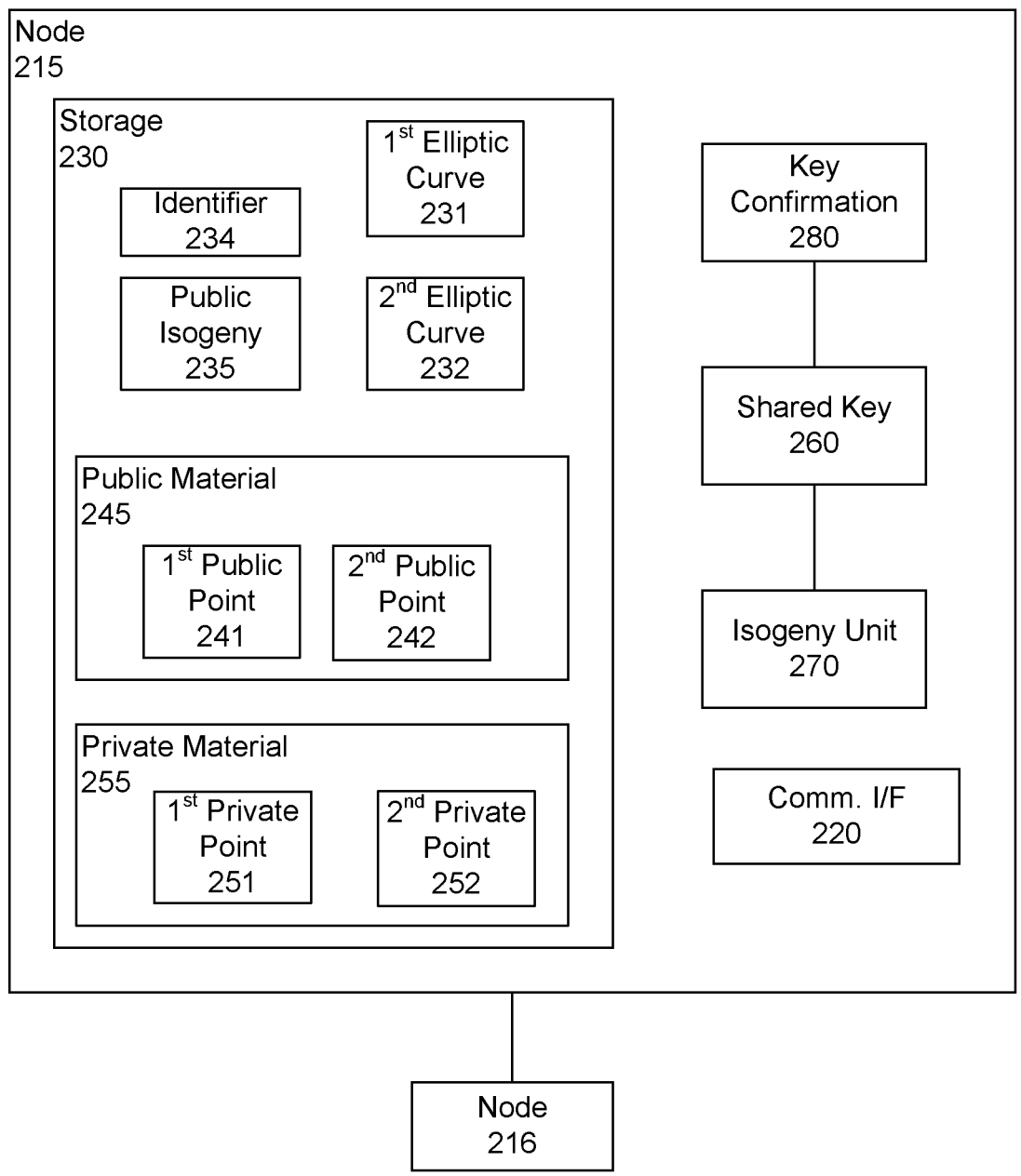

An advantage of the protocol implemented in node 210 is that shared key can be computed without exchanging any messages, so long the digital identifier of the other node is known. The derived key can then be used to derive a key for symmetric encryption FIG. 3b schematically shows an example of an embodiment of a key agreement system 201. System 201 is similar to system 200 except that it uses key pre-distribution of the second key type. System 201 comprises multiple network nodes; shown are nodes 215 and 216.

As network node 210, node 215 comprises a storage 230. Storage 230 comprises public key material 245, private key material 255, first elliptic curve 231, second elliptic curve 232, and digital identifier 234. As in node 210 some of this is optional, e.g., only one of digital identifier 234 and public material 245 is needed. The first elliptic curve 231 and second elliptic curve 232 need not be explicit but may be implicit, e.g., hard coded in algorithms for point multiplication, bilinear maps and the like.

A difference with node 210 is that in node 215 the first public point 241 and first private point 251 lie on the same elliptic curve, and that the second public point 242 and second private point 252 lie on the other elliptic curve. Furthermore, storage 230 of FIG. 3b comprises a public isogeny 235. The public isogeny 235 is a mapping from the first elliptic curve to the second elliptic curve (or vice versa). Preferably, public isogeny 235 is a low degree isogeny. Interestingly, the degree of the isogeny adds little to the security as the isogeny is public, however, a lower degree allows easier implementation at the nodes. In embodiments of this type, the public isogeny ensures that each node executes the bilinear map on the same curve; in case the public isogeny maps from the first to the second curve, both the first and second node compute the bilinear map on the second curve.

Node 215 comprises an isogeny unit 270 configured to apply the public isogeny defined by information 235 to a point on the first curve 231. In particular, isogeny unit 270 will be applied to a public point on the first curve that is received from the second node, or computed for the second node from its digital identifier, or isogeny unit 270 will be applied to the private point 251 of node 215 itself on the first curve. Isogeny unit 270 in an embodiment of the second type may use a similar design as isogeny unit 150 in an embodiment of the first type, except that isogeny unit 270 does not need to evaluate any dual isogenies.

Shared key unit 260 is arranged to obtain a public elliptic curve point for the second network node, wherein the public elliptic curve point may lie on any one of the first and second elliptic curves. Shared key unit 260 could compute the public elliptic curve point for the second network node or receive it. Shared key unit 260 also selects a private elliptic curve point from storage 230 of FIG. 3b, which lies on the other elliptic curve than the public point for node 216. At this point shared key unit 260 has obtained two elliptic curve points, one on each of the two curves, one of which is private for node 215, and one of which is public for node 216. Next shared key unit 260 applies isogeny unit 270 to the point that lies on the first elliptic curve, this may be a public or a private point. The result is that two points are now obtained on the second elliptic curve. Finally, shared key unit 270 evaluates the bilinear map e for the second elliptic curve and the two points on it.

As for node 210, from the result of the bilinear map the shared key may be derived, e.g., using a KDF. In case of point compression, the trace of the result of the bilinear map may be used to derive the shared key.

The nodes may be configured depending on who is the initiating node, and which point to use. For example, the initiator may use the first public point for the responding node, whereas the responder uses the second public point of the initiator.

In the various embodiments, e.g., with respect to key pre-distribution device 110, or network node 210, 215 the communication interface may be selected from various alternatives. For example, a communication interface may be a network interface to a local or wide area network, e.g., the Internet, a storage interface to an internal or external data storage. The communication interface may be a card reader, etc.

Storage 130, 230 may be implemented as an electronic memory, e.g. a flash memory, or magnetic memory, e.g. a hard disk or the like. Storage 130, 230 may comprise multiple discrete memories together making up the storage. Storage 130, 230 may also be a temporary memory, e.g. a RAM, but in case of a temporary storage, the storage contains some means to obtain the parameters before use, e.g. by obtaining them over an optional network connection (not shown).

Typically, the devices 110, 210, and 215 each comprise a microprocessor (not separately shown) which executes appropriate software stored at the devices 110, 210, and 215; for example, that software may have been downloaded and/or stored in a corresponding memory, e.g., a volatile memory such as RAM or a non-volatile memory such as Flash (not separately shown). Alternatively, the devices 110, 210, and 215 may, in whole or in part, be implemented in programmable logic, e.g., as field-programmable gate array (FPGA). Devices 110, 210, and 215 may be implemented, in whole or in part, as a so-called application-specific integrated circuit (ASIC), i.e. an integrated circuit (IC) customized for their particular use. For example, the circuits may be implemented in CMOS, e.g., using a hardware description language such as Verilog, VHDL etc.

In an embodiment, key pre-distribution device 110 comprises a communication interface circuit, a storage circuit, an elliptic hash unit circuit, an isogeny unit circuit. In an embodiment, network node 210 comprises a communication interface circuit, a storage circuit, a shared key unit circuit, and an optional key confirmation unit circuit. Network node 215 may also comprise an isogeny unit circuit. The circuits may be a processor circuit and storage circuit, the processor circuit executing instructions represented electronically in the storage circuits.

A processor circuit may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only.

Figure 4:
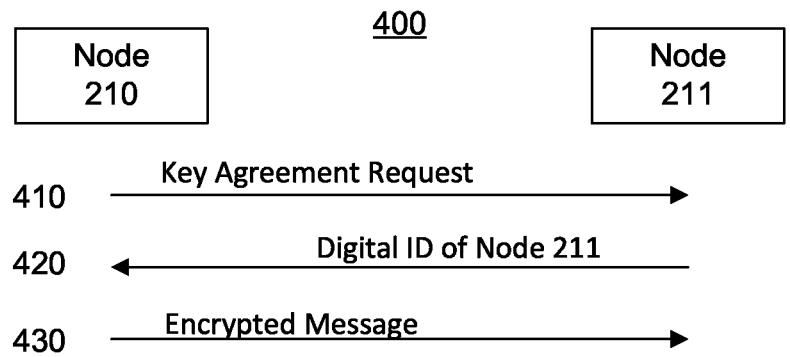

FIG. 4 schematically is a simplified sequence diagram that illustrates an example of an embodiment of a key agreement method. A shared key is established between network nodes 210 and 211 as in FIG. 3a. However, a similar method is applicable to nodes 215 and 216 of FIG. 3b. The message sequence 400 that is shown in FIG. 4 comprises multiple messages exchanged between the nodes, shown are messages 410, 420, and 430.

In a first message 410, node 210 sends a key agreement request to node 211. The request includes the digital identifier $ID_1$ of node 210. A second message 420, sent from node 211 to node 210, comprises the digital identifier $ID_2$ of node 211.

At this point, node 210 computes the second public point of node 211: $H_2(ID_2)$ and selects his own first private point $\varphi(H_1(ID_1))$. Node 210 computes the bilinear map $e(H_2(ID_2), \varphi(H_1(ID_1)))$ and derives the shared key from the result.

All or part of message 430, send from node 210 to 211, is protected, e.g., encrypted and/or authenticated, e.g., using a block cipher or a message authentication code (MAC) using the obtained shared key. The contents of the protected part may be unrelated to the key agreement protocol, e.g., to serve some further communication need of nodes 210, and 211, e.g., to exchange sensor values, etc.

Before or after receiving message 430, Node 211 computes the first public point of node 210: $H_1(ID_1)$ and selects his own second private point $\varphi'(H_2(ID_2))$. Node 210 computes the bilinear map $e(H_1(ID_1), \varphi'(H_2(ID_2)))$ and derives the shared key from the result. The shared key can then be used by node 211 to decrypt and/or verify message 430 or part thereof.

If the nodes 210 and 211 already know the digital identifier of the other node, then messages 410 and 420 may be cancelled. Message 430 may comprise a key confirmation token, computed by node 210. Message 420 may comprise a challenge from node 211, e.g., a nonce, which is to be encrypted by node 210. Message 430 may comprise a challenge to node 211. A further message from node 211 to node 210 may comprise a key confirmation token computed by node 211.

An application of the key agreement protocol is in messaging applications. For example, in such an application it may be assumed that the sender already has an identifier of receiver. For example, a first network node may send a message to a second network node including: The identifier of the first network node, a protected message. For example, the identifier of the first network node may be a (mobile) telephone number, an email address, a computer address, e.g., an IP address, and the like. The first node is able to compute the shared key in advance since it knows the identifier, e.g., the telephone number, of the second node for which the message is intended. The message may be directly sent to the second node by the identifier, e.g., in the case of an email address or a computer address. The message may also be sent by an intermediary, e.g., a routing service, that sends the message over a computer network to a device associated with the identifier, e.g., a telephone number. In the latter case, the nodes may use the telephone number during registration to obtain local key material, and include a computer address for routing messages. Interestingly, the first node can send a message even if the second node is currently offline and not able to interactively participate in a key agreement protocol. The message of the first node may be kept in a buffer, e.g., by a routing device, until the second device is online.

Figure 5:
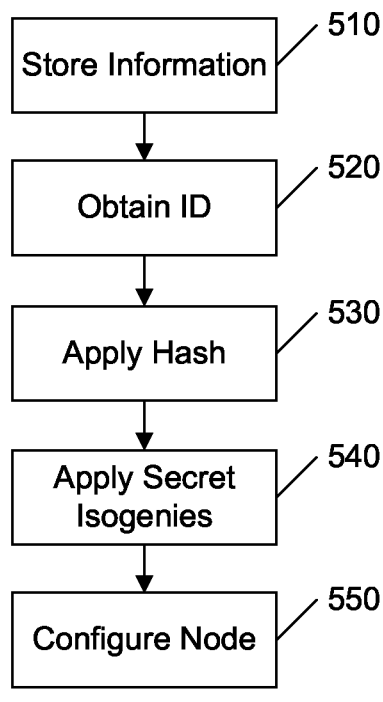

FIG. 5 schematically shows an example of an embodiment of a key pre-distribution method 500. Method 500 for key pre-distribution configures multiple network nodes such as nodes 210 and 211 or nodes 215 and 216 with local key information, Key pre-distribution method 500 comprises:

storing 510 information 135 representing a first secret isogeny φ; s for a first elliptic curve 131; $E_1$ and a second secret isogeny φ'; s for a second elliptic curve 132; $E_2$, an isogeny being arranged to receive a point on an elliptic curve and to produce a point on an elliptic curve as output, obtaining 520 a digital identifier ID for a network node 210, applying 530 at least a first hash function 147 and a second hash function 148 to the digital identifier, the first and second hash functions mapping the digital identifier to a first public point 141; $H_1(ID)$ and a second public point 142; $H_2(ID)$ on a first elliptic curve 131 and second elliptic curve 132, the first elliptic curve being different from the second elliptic curve, the first and second public point being part of public key material 145 for the network node 210, applying 540 the first and second secret isogeny 135 to the first and second public elliptic curve point 141, 142, thus obtaining a first private elliptic curve point 151 and second private elliptic curve point 152 being part of private key material 155 for the network node 210, and configuring 550 the network node with the private elliptic curve point over a communication interface.

Figure 6:
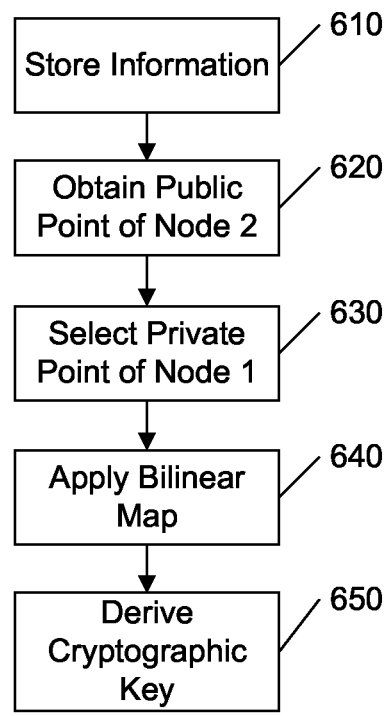

FIG. 6 schematically shows an example of an embodiment of a key agreement method 600. Method 600 establishes a shared key between two network nodes, such as first network node 210 and a second network; or first network node 215 and a second network node 216. Method 600 comprises storing 610 a digital identifier 234; ID for the first network node and/or a first and second public elliptic curve point, the first and second public elliptic curve point lying on a first and second elliptic curve, and a first private elliptic curve point 251 and second private elliptic curve point 252 corresponding to the first public elliptic curve point 241 and the second public elliptic curve point 242 through a first and second secret isogeny 135, the first public elliptic curve point 241 and the second public elliptic curve point 242 corresponding to the digital identifier 234 of the network node 210 through a first and second hash function 147, 148, the first and second private elliptic curve points being computed by a key pre-distribution device 110, obtaining 620 a public elliptic curve point $H_2$ ($ID_R$) for the second network node, the public elliptic curve point lying on a first one of the first and second elliptic curves, selecting 630 a private elliptic curve point from the first and second private elliptic curve points lying on a second one of the first and second elliptic curves, the first one and the second one being different, applying 640 a bilinear map e to the selected private point of the first network node, and the obtained public elliptic curve point of the second network node or the public elliptic curve point of the second network node to which a public isogeny has been applied by the first node, deriving 650 a cryptographic key from the result of the bilinear map.

Many different ways of executing methods 500 and 600 are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. Moreover, a given step may not have finished completely before a next step is started.

A method according to the invention may be executed using software, which comprises instructions for causing a processor system to perform method 500 or 600. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. A method according to the invention may be executed using a bitstream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source, and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into sub-routines and/or be stored in one or more files that may be linked statically or dynamically. Another embodiment relating to a computer program product comprises computer executable instructions corresponding to each of the means of at least one of the systems and/or products set forth.

Figure 7A:
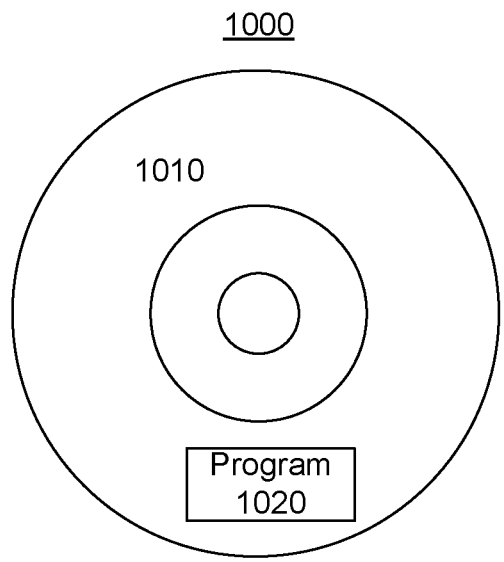

FIG. 7a shows a computer readable medium 1000 having a writable part 1010 comprising a computer program 1020, the computer program 1020 comprising instructions for causing a processor system to perform a method of key pre-distribution or key agreement, according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said method of key pre-distribution or key agreement.

Figure 7B:
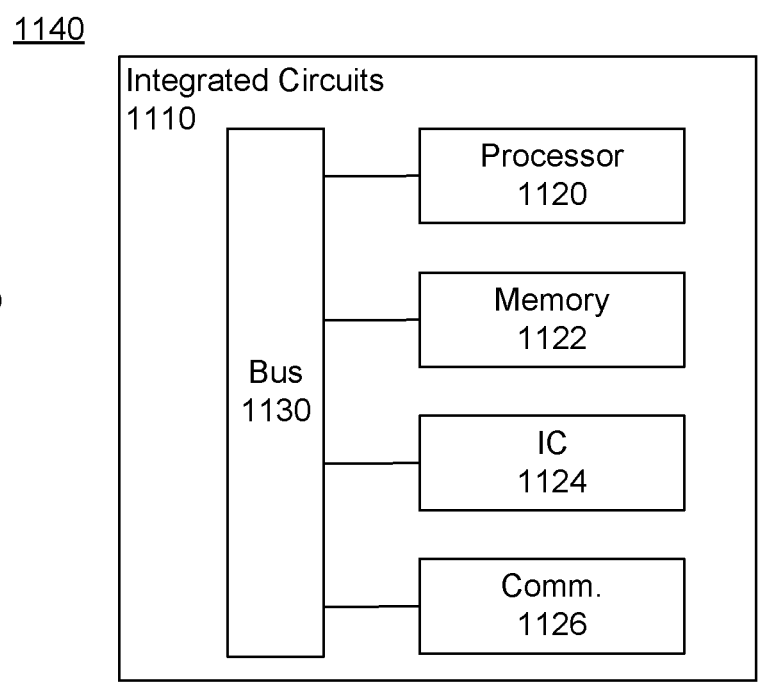

FIG. 7b shows in a schematic representation of a processor system 1140 according to an embodiment. The processor system comprises one or more integrated circuits 1110. The architecture of the one or more integrated circuits 1110 is schematically shown in FIG. 7b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, e.g. a bus. The processor system 1110 may be arranged for contact and/or contact-less communication, using an antenna and/or connectors, respectively.

For example, in an embodiment, the key pre-distribution device or key agreement device, e.g., a network node, may comprise a processor circuit and a memory circuit, the processor being arranged to execute software stored in the memory circuit. The memory circuit may be a ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

The invention claimed is:

1. A first network node comprising:
a storage circuit or storage medium comprising a first private point,
wherein the first private point corresponds to an application of a first isogeny to a first public point on a first elliptic curve,
wherein the first private point is on a second elliptic curve,
wherein the first public point corresponds to a first elliptic hash of a digital identifier of the first network node; and
a processor circuit,
wherein the processor circuit is arranged to obtain a second public point,
wherein the second public point is for a second network node,
wherein the second public point is on the second elliptic curve,
wherein the processor circuit is arranged to apply a bilinear map to the first private point and the second public point,
wherein the processor circuit is arranged to derive a cryptographic key from the result of the bilinear map,
wherein the processor circuit is arranged to receive an encrypted message from the second network node, and
wherein the processor circuit is arranged to decrypt the encrypted message using the cryptographic key to produce a decrypted message.

2. The first network node of claim 1, wherein the processor circuit is arranged to apply a second isogeny to the second public point before applying the bilinear map.

3. The first network node of claim 1, wherein the processor circuit is arranged to compute key confirmation data from the cryptographic key so as to allow the second network node to verify that the first network node correctly computed the cryptographic key.

4. The first network node of claim 1,
wherein the processor circuit is arranged to encrypt a second message with the cryptographic key,
wherein the processor circuit is arranged to send the encrypted second message to the second network node.

5. The first network node of claim 1,
wherein the storage circuit or storage medium comprises a second private point,
wherein the second private point corresponds to an application of a second isogeny to a third public point on the second elliptic curve,
wherein the second private point is on the first elliptic curve,
wherein the third public point corresponds to a second elliptic hash of the digital identifier of the first network node,
wherein the processor circuit is arranged to obtain a fourth public point,
wherein the fourth public point is for the second network node,
wherein the fourth public point is on the first elliptic curve,
wherein the processor circuit is arranged to apply a second bilinear map to the second private point and the fourth public point,
wherein the processor circuit is arranged to derive a second cryptographic key from the result of the second bilinear map,
wherein the processor circuit is arranged to receive a second encrypted message from the second network node, and
wherein the processor circuit is arranged to decrypt the second encrypted message using the second cryptographic key to produce a second decrypted message.

6. A method for establishing secure communication between a first network node and a second network node, the method comprising:
- storing a first private point,
  - wherein the first private point corresponds to an application of a first isogeny to a first public point on a first elliptic curve,
  - wherein the first private point is on a second elliptic curve,
  - wherein the first public point corresponds to a first elliptic hash of a digital identifier of the first network node;
- obtaining a second public point,
  - wherein the second public point is for the second network node,
  - wherein the second public point is on the second elliptic curve;
- applying a bilinear map to the first private point and the second public point;
- deriving a cryptographic key from the result of the bilinear map;
- receiving an encrypted message from the second network node; and
- decrypting the encrypted message using the cryptographic key to produce a decrypted message.

7. The method of claim 6, comprising applying a second isogeny to the second public point before applying the bilinear map,
- wherein the second isogeny is public.

8. The method of claim 6, comprising computing key confirmation data from the cryptographic key so as to allow the second network node to verify that the first network node correctly computed the cryptographic key.

9. The method of claim 6, comprising:
- encrypting a second message with the cryptographic key, and
- sending the encrypted second message to the second network node.

10. The method of claim 6, comprising:
- storing a second private point,
  - wherein the second private point corresponds to an application of a second isogeny to a third public point on the second elliptic curve,
  - wherein the second private point lies on the first elliptic curve,
  - wherein the third public point corresponds to a second elliptic hash of the digital identifier of the first network node,
- obtaining a fourth public point,
  - wherein the fourth public point is for the second network node,
  - wherein the fourth public point is on the first elliptic curve,
- applying a second bilinear map to the second private point and the fourth public point,
- deriving a second cryptographic key from the result of the second bilinear map,
- receiving a second encrypted message from the second network node, and
- decrypting the second encrypted message using the second cryptographic key to produce a second decrypted message.

11. A non-transitory computer readable medium comprising a computer program, wherein the computer program when executed on a processor performs the method as claimed in claim 6.

12. A first network node comprising:
- a storage circuit or storage medium comprising a first private point,
  - wherein the first private point corresponds to an application of a first isogeny to a first public point on a first elliptic curve,
  - wherein the first private point is on a second elliptic curve,
  - wherein the first public point corresponds to a first elliptic hash of a digital identifier of the first network node; and
- a processor circuit,
  - wherein the processor circuit is arranged to obtain a second public point,
  - wherein the second public point is for a second network node,
  - wherein the second public point is on the second elliptic curve,
  - wherein the processor circuit is arranged to apply a bilinear map to the first private point and a public isogeny of the second public point,
  - wherein the processor circuit is arranged to derive a cryptographic key from the result of the bilinear map,
  - wherein the processor circuit is arranged to receive an encrypted message from the second network node, and
  - wherein the processor circuit is arranged to decrypt the encrypted message using the cryptographic key to produce a decrypted message.

13. The first network node of claim 12, wherein the processor circuit is arranged to compute key confirmation data from the cryptographic key so as to allow the second network node to verify that the first network node correctly computed the cryptographic key.

14. The first network node of claim 12,
- wherein the processor circuit is arranged to encrypt a second message with the cryptographic key, and
- wherein the processor circuit is arranged to send the encrypted second message to the second network node.

15. A method for establishing secure communication between a first network node and a second network node, the method comprising:
- storing a first private point,
  - wherein the first private point corresponds to an application of a first isogeny to a first public point on a first elliptic curve,
  - wherein the first private point is on a second elliptic curve,
  - wherein the first public point corresponds to a first elliptic hash of a digital identifier of the first network node;
- obtaining a second public point,
  - wherein the second public point is for the second network node,
  - wherein the second public point is on the second elliptic curve;
- applying a bilinear map to the first private point and a public isogeny of the second public point;
- deriving a cryptographic key from the result of the bilinear map;
- receiving an encrypted message from the second network node; and
- decrypting the encrypted message using the cryptographic key to produce a decrypted message.

16. The method of claim 15, comprising computing key confirmation data from the cryptographic key so as to allow the second network node to verify that the first network node correctly computed the cryptographic key.

17. The method of claim 15, comprising:
encrypting a second message with the cryptographic key, and
sending the encrypted second message to the second network node.

* * * * *